US012743709B2

(12) United States Patent
Jain et al.

(10) Patent No.: US 12,743,709 B2
(45) Date of Patent: Sep. 22, 2026

(54) SYSTEMS AND METHODS FOR USE IN PROCESSING UNSTRUCTURED DATA INTO RELEVANT RECOMMENDATIONS

(71) Applicant: MASTERCARD INTERNATIONAL INCORPORATED, Purchase, NY (US)

(72) Inventors: Shubham Jain, Athlone (IE); Anger Ang, London (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 18/629,306

(22) Filed: Apr. 8, 2024

(65) Prior Publication Data

US 2024/0362664 A1 Oct. 31, 2024

Related U.S. Application Data

(60) Provisional application No. 63/462,945, filed on Apr. 28, 2023.

(51) Int. Cl.

| | |
|---|---|
| ***G06Q 30/02*** | (2023.01) |
| ***G06N 3/044*** | (2023.01) |
| ***G06N 3/0464*** | (2023.01) |
| ***G06Q 30/0207*** | (2023.01) |

(52) U.S. Cl.

CPC ......... *G06Q 30/0224* (2013.01); *G06N 3/044* (2023.01); *G06N 3/0464* (2023.01)

(58) Field of Classification Search

None

See application file for complete search history.

(56) References Cited

U.S. PATENT DOCUMENTS

| | | | | |
|---|---|---|---|---|
| 10,002,322 | B1 * | 6/2018 | Ravindran | G06N 3/0442 |
| 2014/0180978 | A1 * | 6/2014 | Martinez | G06N 3/045 706/12 |
| 2015/0032546 | A1 * | 1/2015 | Calman | G06Q 30/0264 705/14.49 |
| 2018/0137404 | A1 * | 5/2018 | Fauceglia | G06N 3/09 |

(Continued)

FOREIGN PATENT DOCUMENTS

| | | |
|---|---|---|
| EP | 4125024 A1 | 2/2023 |

*Primary Examiner* — Vincent M Cao

(74) *Attorney, Agent, or Firm* — Harness, Dickey & Pierce, P.L.C.

(57) ABSTRACT

Disclosed are example embodiments of systems and methods for generating one or more recommendations based on, at least in part, unstructured data. In an example embodiment, a method generally includes accessing transaction data representative of a plurality of transactions, the transaction data including unstructured data describing ones of the plurality of transactions and structured data indicative of the transactions, where at least a portion of the transactions involve a user. The method also includes compiling, by a computing device, using a convolution neural network (CNN) with the unstructured data from the transaction data and a recurrent neural network (RNN) with structure data of the transaction data, one or more feature vector indicative of the user. The method then includes generating a recommendation based on the feature vector for the user and publishing the recommendation.

12 Claims, 7 Drawing Sheets

(56) References Cited

U.S. PATENT DOCUMENTS

| | | | | |
|---|---|---|---|---|
| 2020/0242465 | A1* | 7/2020 | Krishnan | G06N 3/045 |
| 2021/0049498 | A1 | 2/2021 | Liu et al. | |
| 2021/0193127 | A1 | 6/2021 | Kang et al. | |
| 2021/0365775 | A1* | 11/2021 | S Nayar | G06N 3/08 |
| 2022/0036260 | A1* | 2/2022 | Krishnan | G06N 3/044 |
| 2022/0156502 | A1* | 5/2022 | Filtenborg | G06V 20/41 |
| 2022/0292080 | A1* | 9/2022 | Rao | G06F 16/9024 |
| 2022/0383156 | A1* | 12/2022 | Harsola | G06N 5/04 |
| 2022/0383301 | A1* | 12/2022 | Jones | G06Q 20/14 |
| 2022/0383314 | A1* | 12/2022 | Jones | G06Q 20/389 |
| 2022/0398266 | A1 | 12/2022 | Yadav et al. | |
| 2023/0030309 | A1* | 2/2023 | Christeas | G06Q 30/08 |
| 2024/0354641 | A1* | 10/2024 | Miller | G06N 3/045 |

* cited by examiner

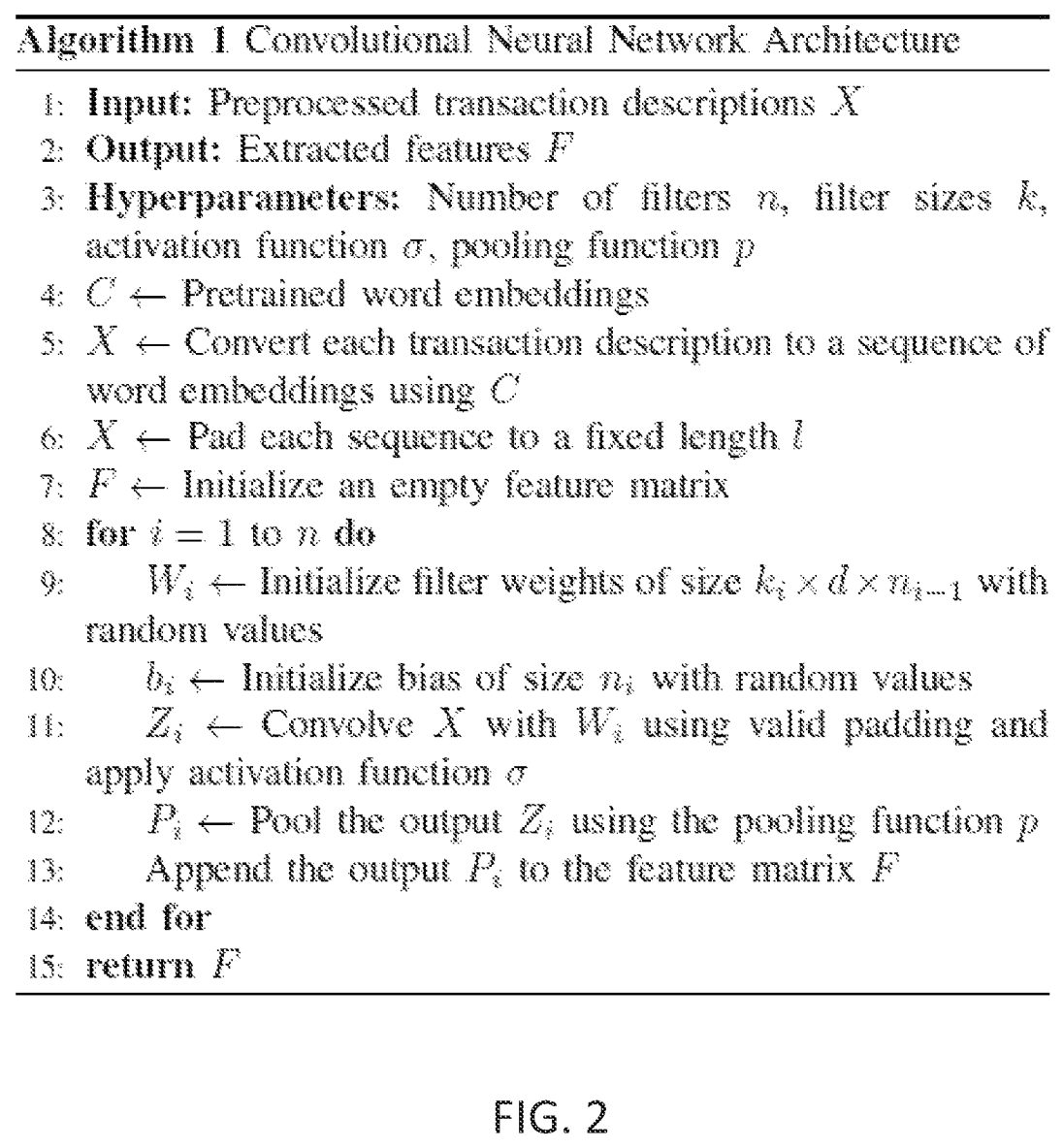

Algorithm 1 Convolutional Neural Network Architecture

1: Input: Preprocessed transaction descriptions $X$
2: Output: Extracted features $F$
3: Hyperparameters: Number of filters $n$, filter sizes $k$, activation function $\sigma$, pooling function $p$
4: $C \leftarrow$ Pretrained word embeddings
5: $X \leftarrow$ Convert each transaction description to a sequence of word embeddings using $C$
6: $X \leftarrow$ Pad each sequence to a fixed length $l$
7: $F \leftarrow$ Initialize an empty feature matrix
8: for $i = 1$ to $n$ do
9: $W_i \leftarrow$ Initialize filter weights of size $k_i \times d \times n_{i-1}$ with random values
10: $b_i \leftarrow$ Initialize bias of size $n_i$ with random values
11: $Z_i \leftarrow$ Convolve $X$ with $W_i$ using valid padding and apply activation function $\sigma$
12: $P_i \leftarrow$ Pool the output $Z_i$ using the pooling function $p$
13: Append the output $P_i$ to the feature matrix $F$
14: end for
15: return $F$

FIG. 2

Algorithm 2 Recurrent Neural Network Training

```
1: Input: Training set D, model parameters θ, learning rate α
2: Output: Trained model parameters θ
3: for each epoch do
4:     for each customer i ∈ D do
5:         Initialize hidden state h_0
6:         for each time step t in customer i's transaction sequence do
7:             Compute LSTM output h_t using Eq. (6)
8:         end for
9:         Compute final feature representation h_T using Eq. (7)
10:        Compute predicted spending trend ŷ_i using ŷ_i = W_y h_T + b_y
11:        Compute loss L(θ) using Eq. (8)
12:        Compute gradients ∂L(θ)/∂θ
13:        Update model parameters using Adam optimization algorithm
14:    end for
15: end for
16: return θ
```

FIG. 3

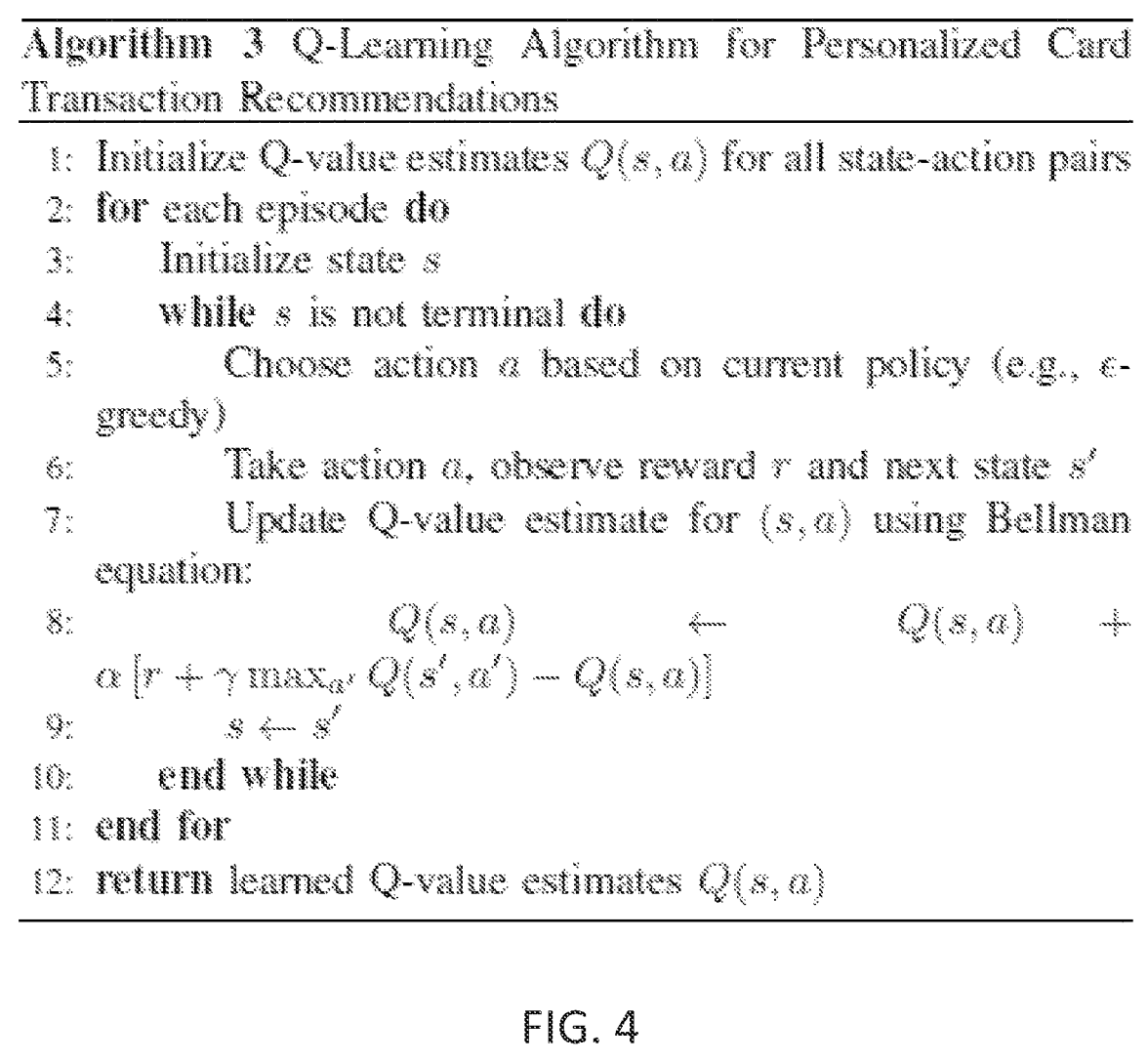

Algorithm 3 Q-Learning Algorithm for Personalized Card Transaction Recommendations 1: Initialize Q-value estimates $Q(s,a)$ for all state-action pairs
2: for each episode do
3: Initialize state $s$
4: while $s$ is not terminal do
5: Choose action $a$ based on current policy (e.g., $\epsilon$-greedy)
6: Take action $a$, observe reward $r$ and next state $s'$
7: Update Q-value estimate for $(s,a)$ using Bellman equation:
8: $Q(s,a) \leftarrow Q(s,a) + \alpha\left[r + \gamma \max_{a'} Q(s',a') - Q(s,a)\right]$
9: $s \leftarrow s'$
10: end while
11: end for
12: return learned Q-value estimates $Q(s,a)$

FIG. 4

Algorithm 4 Deep Q-Network (DQN) Algorithm

Initialize DQN weights $\theta$ and target network weights $\theta^{-}$
Initialize replay buffer $\mathcal{D}$ and exploration rate $\epsilon$
for each episode do
    Initialize state $s$
    while $s$ is not terminal do
        Choose action $a$ based on current policy (e.g., $\epsilon$-greedy)
        Take action $a$, observe reward $r$ and next state $s'$
        Store experience $(s, a, r, s')$ in replay buffer $\mathcal{D}$
        Sample random minibatch of experiences from $\mathcal{D}$
        Compute target Q-values $y_j =$
        Compute target Q-values $y_j =$
        Compute target Q-values $y_j =$ $$\begin{cases} r_j & \text{if episode terminates at step } j+1 \\ r_j + \gamma \max_{a'} Q(s_{j+1}, a'; \theta^{-}) & \text{otherwise} \end{cases}$$

Update DQN weights by minimizing the loss function:

$$L(\theta) = \frac{1}{N} \sum j = 1^{N} (y_j - Q(s_j, a_j; \theta))^2$$

Update target network weights: $\theta^{-} \leftarrow \tau\theta + (1-\tau)\theta^{-}$
        $s \leftarrow s'$
    end while
    $\epsilon \leftarrow \max(\epsilon_{\min}, \epsilon \times \epsilon_{decay})$
end for
return learned DQN weights $\theta$

FIG. 5

SYSTEMS AND METHODS FOR USE IN PROCESSING UNSTRUCTURED DATA INTO RELEVANT RECOMMENDATIONS

CROSS-REFERENCE TO RELATED APPLICATION

This application claims the benefit of, and priority to, U.S. Provisional Application No. 63/462,945, filed Apr. 28, 2023. The entire disclosure of the above application is incorporated herein by reference.

FIELD

The present disclosure generally relates to systems and methods for processing historical data, including unstructured data, to generate relevant recommendations relating thereto.

BACKGROUND

This section provides background information related to the present disclosure which is not necessarily prior art.

Users are known to interact with different entities for a number of different reasons. In one example, users interact with entities to purchase products (e.g., goods, services, etc.). The users are further known to fund the purchases through accounts, whereby the funds are transferred from issuers of the account to the entities and then later repaid by the users to the issuers, as part of a credit transaction. In connection with the interactions, data is collected, compiled and stored to provide records of the interactions. The data may be referred to as transaction data.

BRIEF DESCRIPTION OF DRAWINGS

The drawings described herein are for illustrative purposes only of selected embodiments and not all possible implementations, and are not intended to limit the scope of the present disclosure.

FIGS. 2-5 are example algorithms that may be implemented in the system of FIG. 1;

Corresponding reference numerals indicate corresponding parts throughout the several views of the drawings.

DETAILED DESCRIPTION

Example embodiments will now be described more fully with reference to the accompanying drawings.

Users engage in a variety of different transactions on a regular basis, to provide for necessities, such as, for example, food and clothing, and also other products, such as, for example, entertainment, fitness, leisure, etc. The transactions are summarized in transaction data, which includes structured and unstructured data indicative of details about the transactions, such as, for example, amounts paid, locations of the transactions, descriptions of the products or services, etc. The transaction data, then, are representative of the users' purchase behaviors. A number of different techniques have been attempted to leverage the transaction data to gain insights about the users. However, such techniques, specific to transaction data, are limited, generally to structured data, whereby the realized insights are less than accurate.

Uniquely, the systems and methods herein rely on structured and unstructured data to generate recommendations for users, whereby the recommendations are aligned with insights indicated in the data associated with the users.

Figure 1:
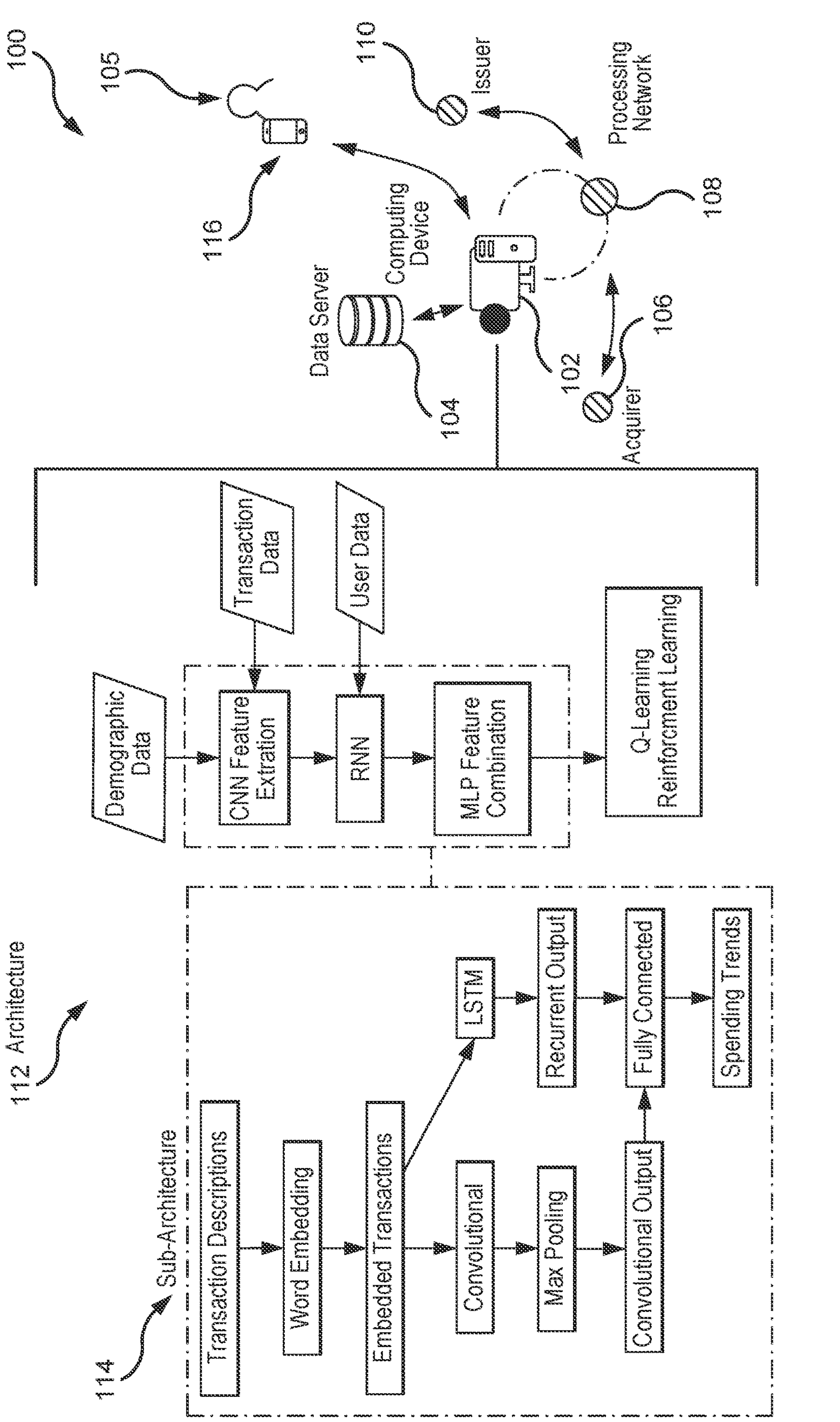
FIG. 1 is a block diagram of an example system of the present disclosure suitable for use in generating one or more recommendations based on, at least in part, unstructured data.

FIG. 1 illustrates an example system 100, in which one or more aspects of the present disclosure may be implemented. Although, in the described embodiment, components of the system 100 are presented in one arrangement, other embodiments may include the same or different components arranged otherwise, depending, for example, on compilations of transaction and demographic data, processing of transactions, privacy rules or regulations; etc.

Referring to FIG. 1, the system 100 generally includes a computing device 102 and a data server 104. The data server 104 may be included in the computing device 102, or coupled to the computing device 102 via one or more networks (as suggested by the arrowed line therebetween). The one or more networks may include, without limitation, a local area network (LAN), a wide area network (WAN) (e.g., the Internet, etc.), a mobile network, a virtual network, and/or another suitable public and/or private network capable of supporting communication among the components, or even combinations thereof.

In this example embodiment, the data server 104 includes various types of data related to various users including an exemplary user 105. The various types of data may include, in this example embodiment, transaction data and demographic data. In addition, the types of data may include other data and/or additional data in other embodiments (e.g., relating to the users, to the transactions, to the products and/or services associated with the transactions, to the accounts used in the transactions, etc.).

The transaction data includes one or more data structures, which includes entries representative of individual account transactions. For example, each transaction includes an interaction between a user and a first party (e.g., a merchant, service provider, etc.). The transaction defines an exchange of funds (e.g., monies, etc.) for one or more goods or services (broadly, products). In connection therewith, the transaction is subject to authorization, clearing and/or settlement between banks associated with the user and the first party. As part thereof, messages are exchanged between the first party, the banks and a processing network. In particular, as shown in FIG. 1, the first party (not shown) is configured to compile and transmit an authorization message to an acquirer 106 (associated with the first party). The message may include an ISO 8583 message, an ISO 20022 message, or other suitable standard message related to payments. The acquirer 106 is configured to communicate the authorization message to an issuer 110 associated with a user involved in the transaction (to which the account is issued) (e.g., user 105, etc.), via a processing network 108, such as, for example, through Mastercard®, VISA®, Discover®, American Express®, etc. Upon receipt, the issuer 110 is configured to approve or decline the transaction and to return an authorization message indicating the same back to the acquirer 106, through the processing network 108. The acquirer 106, the issuer 110 and the processing network 108 may be configured to then cooperate to clear and settle the transaction. The first party, the acquirer 106, the processing network 108, and the issuer 110 may provide such communications/messaging via one or more networks (as indicated by the arrowed lines in FIG. 1). The one or more networks, again, may include, without limitation, a local area network (LAN), a wide area network (WAN) (e.g., the Internet, etc.), a mobile network, a virtual network, and/or another suitable public and/or private network capable of supporting communication among two or more of the components illustrated in FIG. 1, or even combinations thereof.

As part of the messaging described above, data is generated, collected, compiled, and stored among the acquirer 106, the processing network 108, and the issuer 110, and stored in the data server 104, as transaction data. The transaction data may include, for each entry, for example, a primary account number (PAN) for account, an amount, a merchant ID, a merchant name (e.g., a retailer name, etc.), a merchant category code (MCC) of the merchant, an acquirer identifier, a location (e.g., a first party, a shipping address, etc.), skew data for product, dates/times of the transactions, descriptions of the products (e.g., repair parts, etc.), first party locations/types/category (e.g., Midwest region, fishing store, etc.), and/or other data associated with the transactions (e.g., status data such as transaction failed due to insufficient funds, etc.), etc. The descriptions and other information relating to the above data may be provided in natural language, which includes one or more words rather than numerical values, etc.

Table 1 includes example transaction data entries, for an example transaction, that may be included in the data server 104.

TABLE 1

| Trx ID | PAN | Trx Amt | First Party Name | MCC | Time/Date | Location | Product Description |
|---|---|---|---|---|---|---|---|
| 0123 | ****1234 | $56.90 | Bob's Store | 5172 | Jan. 15: 10:54:35 | 63122 | Globe Newspaper, daily |

It should also be appreciated that more or less data and/or information related to transactions, as part of authorization, clearing, and/or settlement of the transactions, may be included in transaction data and stored in the data server 104 in other embodiments.

In addition to the transaction data, the data server 104 also includes demographic data for various users, including the user 105. The demographic data may be generic to multiple users, which includes age, gender, ethnicity, residency, income (e.g., by number or range, etc.), marital status, education, employment, etc.

The above described data is generally divisible into two types: number data and natural language data. The numeric data includes a numeric value, which is particular to a specific feature and is generally considered to be structured data. For example, an account number is numeric data, which is specific and unique to an account. Natural language data, conversely, includes one or more words used to describe some aspect of the transaction or participant or result (e.g., where the first party name is 'Bob's Store', etc.). Natural language data may be generally considered any type of unstructured data.

With reference to FIG. 1, generally, it should be understood that in the system 100, the computing device 102 and/or the data server 104 is associated with and/or included in the processing network 108, whereby the transaction data is generally associated with transactions processed through the processing network 108. That said, it should also be understood that the computing device 102 and/or data server 104 may be included otherwise in the system 100, for example, at least in part in the acquirer 106, the issuer 110, etc., or remain as standalone from the different parts of the system 100. What's more it should be appreciated that various other acquirers and issuers are generally included, whereby the volume of transaction data, users, demographic data, etc., is substantial (e.g., on the order of millions of records, or more, etc.).

In view of the above, the computing device 102 is configured with architecture 112 in FIG. 1. As shown the architecture 112 includes multiple interconnected stages designed to extract relevant features from the data included in the data server 104 and use the relevant features to generate personalized recommendations, for the user 105 and other users.

In particular, input data to the architecture 112 is raw data, which includes the above demographic data and transaction data. Initially, in this exemplary embodiment, the structured and unstructured data may be subject to one or more pre-processing operations. For example, the computing device 102 may be configured to pre-process the unstructured data, using natural language processing (NLP) techniques, such as tokenization, stemming, and stop-word removal, in order to extract useful information from the unstructured data (e.g., transaction descriptions, etc.). As such, the computing device 102 may be configured to initially clean the raw input data. The computing device 102 may also be configured to perform feature engineering, by extracting temporal features (e.g., frequency and recency of transactions for the respective accounts, etc.) and/or by using one-hot encoding to represent categorical features, such as, for example, MCC and user demographic information, etc.

Next, consistent with the architecture 112, the computing device 102 is configured to compile one or more feature vectors indicative of the user(s) of the transaction(s).

In connection therewith, the computing device 102 is configured, by the architecture 112, to extract pertinent feature data through multiple deep learning aspects. The first aspect of the illustrated exemplary architecture 112 includes a convolutional neural network (CNN) feature extraction technique for extracting characteristics from demographic data, and the second aspect of the illustrated exemplary architecture 112 includes a recurrent neural network (RNN) temporal dynamics modeling technique for extracting temporal patterns and dependencies from the transaction data.

In more detail, the CNN is configured, during training, to extract semantic and syntactic data from the unstructured data (e.g., pre-processed transaction descriptions, etc.). The training data includes a substantial set of data, in excess of ten(s) of thousand, hundred(s) of thousand, or one million transaction records or more, etc. The CNN is trained based on a word embedding matrix (ices) to represent each word in the transaction description as a vector of fixed dimensionality. The vectors are provided to the CNN, during training, whereby the CNN is configured to identify meaningful features from the unstructured data. The CNN includes multiple convolutional layers, followed by pooling layer(s), to extract and down-sample the features of the data. The exemplary CNN includes a final convolutional layer, which provides a flattened, one-dimensional vector that is provided to a fully connected layer to map the features of the data to a lower-dimensional space. The fully connected layer's output is processed via a rectified linear unit (ReLU) activation function, which creates non-linearity in the output.

The above is illustrated in a sub-architecture 114, as a more detailed view of the dotted box of the architecture 112.

As it relates to the above, $W_i$ denotes a set of convolutional filters at layer i, where $i \in 1, \ldots, L$ and L is the number of convolutional layers. The input to the i-th layer is a sequence of $m_i$-dimensional vectors x1: i=[$x_1$, $x_2$, . . . , $x_i$], where $x_j \in R^{m_j}$. Each convolutional layer applies $k_i$ filters of size $h_i \times m_i$, where $h_i$ is the size of the filter in the time dimension. The output of the i-th convolutional layer is a sequence of $k_i$-dimensional vectors $c^{(i)}1$: $m_i$, where $c^{(i)}$ j=[$c^{(i)}$j, 1, $c^{(i)}$j, 2, . . . , $c^{(i)}$j, $k_i$]. Operation of the i-th convolutional layer can be formalized as Expression (1):

$$c_j^{(i)} = \left(f\left(W_i \cdot x_j - h_i + 1 : j\right)\right) \quad (1)$$

where f is a non-linear activation function such as ReLU. The operation of the pooling layer can be formalized as Expression (2):

$$p^{(i)} j = \max\left(c^{(i)} j - p_i + 1 : j\right) \quad (2)$$

where $$p_j^{(i)}$$

is the output of the i-th pooling layer at time j, and $p_i$ is the size of the pooling window in the time dimension. The output of the last convolutional layer is fed into a fully connected layer, which maps the features to a lower dimensional space as represented by Expression (3):

$$h^{(CNN)} = ReLU\left(Wfc \cdot \text{flatten}\left(p^{(L)}\right) + bfc\right) \quad (3)$$

where Wfc is the weight matrix of the fully connected layer, bfc is the bias vector, and flatten ($p^{(L)}$) denotes the flattened output of the last pooling.

Further, in Algorithm 1, as shown in FIG. 2, the CNN is used for feature extraction from the processed transaction descriptions X (i.e., unstructured data). The input to Algorithm 1 is a sequence of processed transaction descriptions X, where each description is converted to a sequence of word embeddings using word embeddings C. The word embeddings are padded to a fixed length l to ensure consistency in the input size.

As explained above, the CNN consists of n filters, where each filter has a size of $k_i \times d \times n_{i-1}$, and where $k_i$ is the filter size, d is the dimension of the word embeddings, and $n_{i-1}$ is the number of filters in the previous layer. The filter weights $W_i$ are initialized with random values, and the bias $b_i$ is initialized with random values as well. The input transaction description X is convolved with each filter $W_i$ using padding, and the output is passed through an activation function σ. The output of the activation function is then pooled using a pooling function p, and the result is appended to the feature matrix F. As shown in Algorithm 1, above, this process is repeated for each filter in the CNN.

With continued reference to FIG. 1, and consistent with the exemplary architecture 112, the computing device 102 is configured to provide the feature matrix F into the RNN, which is configured, in turn, to capture the temporal dynamics of transaction data and identify spending trends. The RNN is used to model the sequence of transactions over time (based on the transaction data and/or feature engineering) and to capture the long-term dependencies in the transaction data. In this example, the computing device 102 is configured to use a Long Short-Term Memory (LSTM) network to model.

In particular, T denotes the number of time steps in the input sequence, and n denotes the dimensionality of the input vectors. The input to the LSTM network at time t is a vector $x_t \in R^n$. The LSTM network maintains a hidden state $h_t$ and a memory cell $c_t$ at each time step, which are updated using the input $x_t$ and the previous hidden state $h_{t-1}$. The operation of the LSTM network can be formalized as represented by Expression (4):

$$\begin{aligned} i_t &= \sigma(W_{xi}x_t + W_{hi}h_{t-1} + b_i) \\ f_t &= \sigma(W_{xf}x_t + W_{hf}h_{t-1} + b_f) \\ o_t &= \sigma(W_{xo}x_t + W_{ho}h_{t-1} + b_o) \\ g_t &= \tanh(W_{xg}x_t + W_{hg}h_{t-1} + b_g) \\ c_t &= f_t \odot c_{t-1} + i_t \odot g_t \\ h_t &= o_t \odot \tanh(c_t) \end{aligned} \quad (4)$$

where σ is the sigmoid function and denotes element-wise multiplication; $W_{xi}$, $W_{hi}$, $W_{xf}$, $W_{hf}$, $W_{xo}$, $W_{ho}$, $W_{xg}$, and $W_{ng}$ are weight matrices; $b_i$, $b_f$, $b_o$, and $b_g$ are bias vectors; and $i_t$, $f_t$, $o_t$, and $g_t$ are the input gate, forget gate, output gate, and memory gate vectors, respectively.

The output of the LSTM at each time step is a vector $h_t \in R^m$, where m is the dimensionality of the hidden state. The computing device 102 is configured, by the architecture 112 (and in particular, the sub-architecture 114), to feed the output sequence into a fully connected layer, which maps the features to a lower-dimensional space as represented by Expression (5):

$$ht = \tanh(W_{hx}xt + W_{hh}ht - 1 + bh) \quad (5)$$

where $W_{hx}$ and $W_{hh}$ are weight matrices, and $b_h$ is a bias vector. The output of the last LSTM unit is used as the final feature representation of the temporal dynamics, of Expression (6):

$$h^{(RNN)} = h_T \quad (6)$$

The RNN is trained using backpropagation through time (BPTT) to limit and/or minimize the mean squared error between the predicted spending trends and the ground truth. An associated loss function is formalized as Expression (7):

$$L(\theta)=\frac{1}{N}\sum_{i=1}^{N}(\hat{y}_i-y_i)^2 \quad (7)$$

where $\hat{y}_i$ is the predicted spending trend for user i, $y_i$ is the ground truth spending trend for user i, and θ are the model parameters. The computing device 102 is configured to train/optimize the model parameters, using Algorithm 2, shown in FIG. 3, where $m_t$ and $v_t$ are the first and second moments of the gradient, ϵ is a small constant to avoid division by zero, and t denotes the current iteration.

By training the RNN using backpropagation through time and optimizing the model parameters, using the above algorithm, the computing device 102 is configured to capture temporal dynamics of user transactions and identify spending trends.

As shown in the exemplary architecture 112 of FIG. 1, the computing device 102 is configured to combine the extracted features, using a multi-layer perceptron (MLP) feature combination technique. In doing so, the computing device 102 is configured to generate the feature vector specific to the individual user (e.g., the user 105, etc.). The feature vector includes features, which are extracted, then, from both the demographic data and transaction data.

More specifically, in the exemplary embodiment, the computing device 102 is configured, as defined in the exemplary sub-architecture 114, to combine the CNN and RNN. In combination, the computing device 102 is configured to rely on a convolutional layer to extract spatial features from the transaction descriptions, followed by a recurrent layer to capture the temporal dynamics of the transaction sequence.

The computing device 102 is configured to input, consistent with the above, to the exemplary sub-architecture 114, a sequence of pre-processed transaction descriptions, represented as a matrix $X\in R^{T\times n}$, where Tis the number of time steps, and n is the dimensionality of the word embeddings. The convolutional layer applies multiple filters to the input matrix to extract spatial features, to provide feature maps into the recurrent layer to capture the temporal dynamics of the transaction sequence. The output of the last LSTM unit is used as the final feature representation of the temporal dynamics. The operation of the exemplary sub-architecture 114 can be expressed as Expression (8):

$$Z_i=\sigma(W_i*X+b_i)Ht=LSTM(Z_t,Ht-1)h^{(Hybrid)}=h_t \quad (8)$$

where * denotes the convolution operation, σ is the ReLU activation function, $W_i$ and $b_i$ are the filter weights and bias, respectively, LSTM denotes the operation of the LSTM layer, and $h^{(Hybrid)}$ is a final feature representation of the exemplary sub-architecture 114.

In connection with training the exemplary sub-architecture 114, the computing device 102 is configured to use backpropagation (as explained above) to limit the mean squared error between predicted spending trends and one or more ground truths. The loss function is formalized, again, as Expression (9):

$$L(\theta)=\frac{1}{N}\sum_{i=1}^{N}(\hat{y}_i-y_i)^2 \quad (9)$$

where $\hat{y}_i$ is the predicted spending trend for user i, $y_i$ is the ground truth spending trend for user i, and θ are the model parameters. The computing device 102 is configured, by the sub-architecture 114, to optimize the model parameters, based on Expression (10):

$$\theta_{t+1}=\theta_t-\alpha_t\frac{m_t}{\sqrt{v_t}+\in} \quad (10)$$

where $\theta_t$ are the model parameters at iteration t, $\alpha_t$ is the learning rate at iteration t, $m_t$ and $v_t$ are the first and second moments of the gradient, and ϵ is a small constant to avoid division by zero.

The computing device 102 is configured to then generate one or more recommendations for the user, using a reinforcement learning technique, such as, for example, Q-Learning. This technique utilizes the combined features in the vector to learn the user's preferences and generate personalized recommendation(s) based on the user's transaction history and demographic data. The recommendation(s) is/are then presented to the user 105, via a communication device 116 associated with the user 105. Based on the user's preferences and transaction history, the recommendations may include tailored offers, discounts, and promotions.

In this exemplary embodiment, Q-learning is a model-free reinforcement learning algorithm used to learn an optimal policy for a Markov Decision Process (MDP) by iteratively estimating the optimal action-value function, Q*(s, a), for each state-action pair (s, a). The optimal action-value function is defined as the expected total discounted reward for taking action $\alpha_i$ in state $s_t$ and then following the optimal policy thereafter.

The computing device 102 is configured to, at each time step t, observe the current state $s_t$ which includes the user's transaction history and personal information, takes an action $\alpha_t$ based on its current policy, and receives a reward $r_t$ and the next state $s_{t+1}$ according to the environment dynamics. The reward function configures an agent to incentivize recommendations that align with the user's past behavior and preferences. The Q-learning algorithm updates the estimates of the action value function using the Bellman equation, which expresses the relationship between the value of a state and the values of its successor states as Expression (11):

$$Q(s_i,a_t)\leftarrow Q(s_t,a_t)+\alpha[r_t+\gamma\max Q(s_{t+1},a')-Q(s_t,a_t)] \quad (11)$$

where α is the learning rate; γ is the discount factor, which determines the importance of future rewards. The term $\max Q(s_{t+1},a')$ is the maximum expected value of the action value function for the next state $s_{t+1}$, and the difference between the two terms is the temporal difference error. As such, the Q-learning algorithm may be stated as Algorithm 3, as shown in FIG. 4.

Consistent with the Q-learning, Algorithm 3 often uses an ϵ-greedy policy, where the agent chooses the action with the highest Q-value with probability 1−ϵ and chooses a random action with probability. The parameter, generally, is reduced over time to rely more on the learned Q-values as compared to exploration.

By using deep reinforcement learning and unstructured data, the computing device 102 is configured with a Personalized Card Transaction Recommendations (PCTR) method, which provides personalized recommendation(s) for users. In PCTR, for example, the state space includes the user's transaction history and other personal information, such as demographic data. The action space is composed of the available credit card offers, and the reward is a measure of the user's satisfaction with the recommended offer.

It should be appreciated that credit card offers are merely one example, and that other account-instructed offers may be determined through the exemplary embodiment of FIG. 1.

That said, to learn the optimal policy, the computing device 102 is configured with a deep Q-network (DQN) algorithm, which extends the Q-learning algorithm, by using a deep neural network to approximate the action-value function. The DQN architecture consists of a convolutional neural network (CNN) and a fully connected network (FCN), which are used to extract features from the input data and estimate the Q-values, respectively. The computing device 102 is configured to train the DQN algorithm in a manner similar to that of the Q-learning algorithm, with a difference being the use of experience replay and target network techniques to improve the stability and convergence of the algorithm. For experience replay, the computing device 102 is configured to store experiences (e.g., tuples including state, action, reward, and next state, etc.) in a buffer and to sample batches of experiences randomly during the training process. In doing so, the computing device 102 is configured to enable potential reduction in the correlation between the experiences and also to prevent the deep neural network from overfitting to more recent experiences.

Further, for a target network, the computing device 102 is configured to use a separate network with the same architecture as the DQN to estimate the target Q-values, which are updated periodically using the weights of the DQN. This technique helps to prevent the Q-values from oscillating during the training process. The DQN algorithm can be summarized as Algorithm 4, as shown in FIG. 5.

Based on the above, the computing device 102 is configured, using the architecture 112, to generate recommendations based on the insights derived from the structure and unstructured input data, as indicated by the Q-values relative to the specific actions. The recommendation(s) is/are then presented to the user 105, via the communication device 116 associated with the user 105. Based on the user's preferences and transaction history, the recommendations may include tailored offers, discounts, and promotions.

The user 105 may then accept or decline the specific recommendation, which provides a feedback loop to the computing device 102, and specifically, the architecture 112. The computing device 102 may be configured to adjust the feature vector indicative of the user and/or weights, biases, etc., associated with the above to account for the feedback from the user 105. Thereafter, the computing device 102 may be configured to generate one or more updated recommendations, consistent with the architecture 112 and the description above, and to provide the recommendations to the user 105, via the communication device 116 associated with the user 105.

Figure 6:
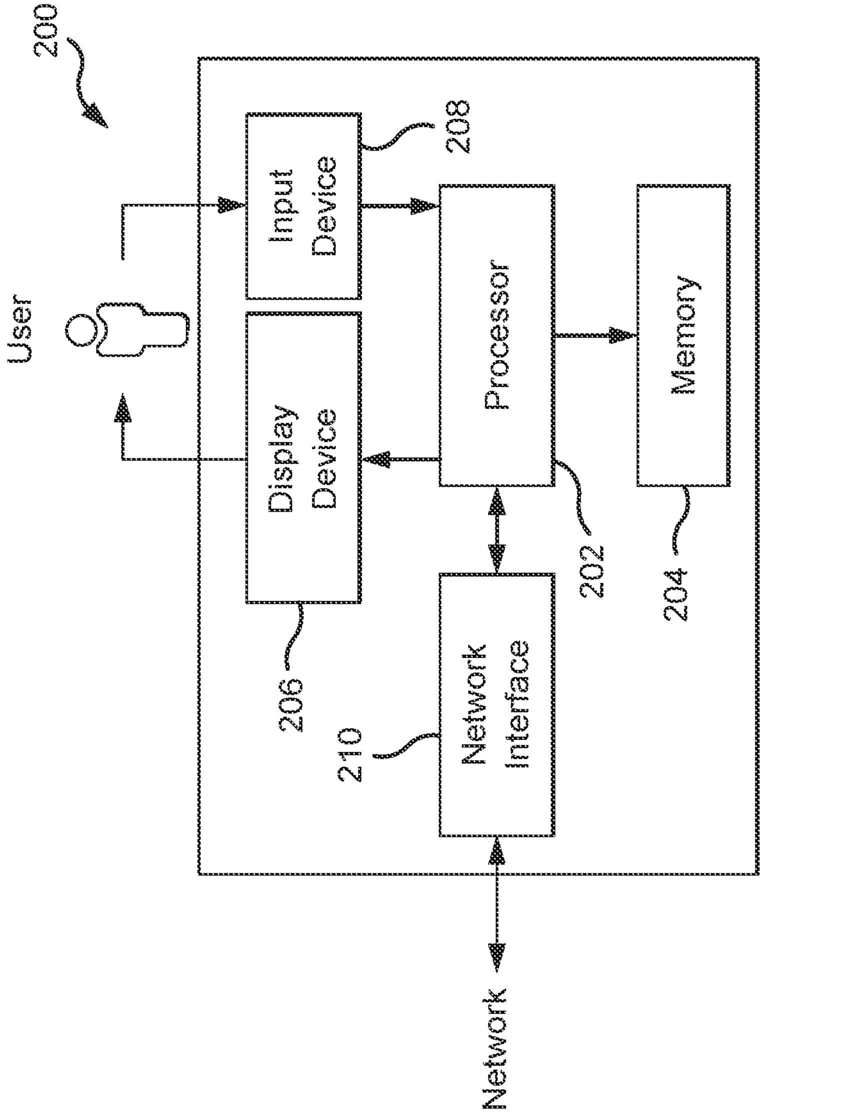
FIG. 6 is a block diagram of an example computing device, that may be used in the system of FIG. 1.

FIG. 6 illustrates an example computing device 200 that can be used in the system 100. The computing device 200 may include, for example, one or more servers, workstations, computers, laptops, tablets, smartphones, virtual devices, etc. In addition, the computing device 200 may include a single computing device, or it may include multiple computing devices located in close proximity or distributed over a geographic region, so long as the computing devices are specifically configured to operate as described herein. In the example embodiment of FIG. 1, the computing device 102, the acquirer 106, the processing network 108 and/or the issuer 110 may include and/or may be implemented in one or more computing devices consistent with computing device 200. In addition, the data server 104, or the structures therein, and the communication device 116, may include, be associated with and/or in communication with, a computing device at least partially consistent with the computing device 200 (or a part thereof, such as, for example, memory 204, etc.). However, the system 100 should not be considered to be limited to the computing device 200, as described below, as different computing devices and/or arrangements of computing devices may be used. In addition, different components and/or arrangements of components may be used in other computing devices.

As shown in FIG. 6, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, a graphics processing unit (GPU), an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. In connection therewith, the memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media for storing such data, instructions, etc. In particular herein, the memory 204 is configured to store data including, without limitation, transaction data, indices, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein (e.g., one or more of the operations of method 300, etc.) in connection with the various different parts of the system 100, such that the memory 204 is a physical, tangible, and non-transitory computer readable storage media. Such instructions often improve the efficiencies and/or performance of the processor 202 that is performing one or more of the various operations herein, whereby such performance may transform the computing device 200 into a special-purpose computing device. It should be appreciated that the memory 204 may include a variety of different memories, each implemented in connection with one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 may output information, visually or otherwise, to a user of the computing device 200, etc. It should be further appreciated that various interfaces (e.g., as defined by network-based applications, websites, etc.) may be displayed at computing device 200, and in particular at presentation unit 206, to display certain information to the user 105. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices. Additionally or alternatively, the presentation unit 206 may include printing capability, enabling the computing device 200 to print text, images, and the like on paper and/or other similar media.

In addition, the computing device 200 includes an input device 208 that receives inputs from the user 105 (i.e., user inputs), etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), or other suitable user input devices. It should be appreciated that in at least one embodiment an input device 208 may be integrated and/or included with a presentation unit 206 (e.g., a touchscreen display, etc.).

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks (e.g., one or more of a local area network (LAN), a wide area network (WAN) (e.g., the Internet, etc.), a mobile network, a virtual network, and/or another suitable public and/or private network capable of supporting wired and/or wireless communication among two or more of the parts illustrated in FIG. 1, etc.), including with other computing devices used as described herein.

Figure 7:
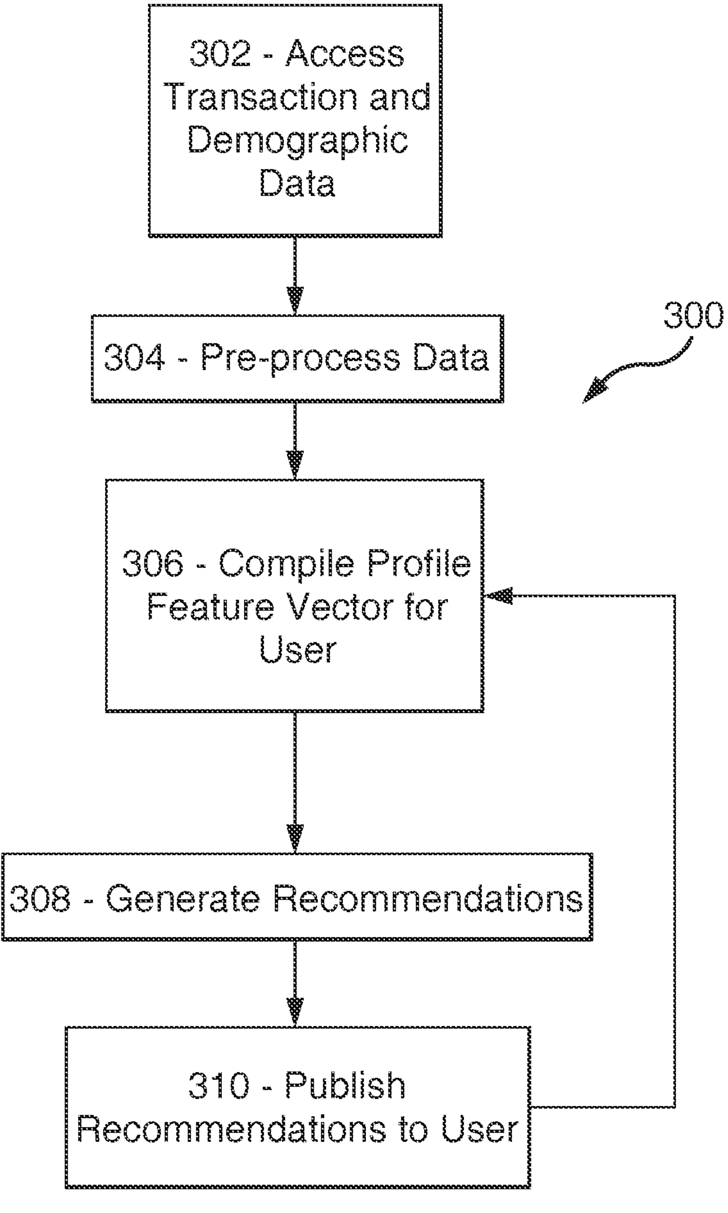
FIG. 7 is an example method that may be implemented in the system of FIG. 1, or otherwise, for generating one or more recommendations based on, at least in part, unstructured data.

FIG. 7 illustrates an example method 300 for use in determining recommendations for users based on historical data, including unstructured historical data. The example method 300 is described herein in connection with the computing device 102 of the system 100, and is also described with reference to computing device 200. However, it should be appreciated that the methods herein are not limited to the system 100, or computing device 200. And, likewise, the systems and computing devices described herein are not limited to the example method 300.

In connection with the above, at 302, the computing device 102 accesses transaction data representative of a plurality of transactions and/or demographic data, from the data server 104. The transaction data includes unstructured data, such as, for example transaction descriptions, which describe ones of the plurality of transactions. The transaction data also includes structured data indicative of the transactions. At least a portion of the transactions, for which data is accessed, involves the user 105. The user 105 is associated with demographic data, which may be the age, gender, income level, employment, etc., of the user 105.

At 304, the computing device pre-processes at least a portion of the accessed data. For example, the pre-processing may include use of natural language processing (NLP) techniques, such as tokenization, stemming, and stop-word removal, etc. Additionally, or alternatively, the pre-processing may involve cleaning the raw input data and/or performing feature engineering.

Next, at 306, the computing device 102 compiles one or more feature vectors indicative of the user 105. The computing device 102 compiles the feature vectors through use of a combination of CNN and RNN, where CNN is used to extract features from unstructured data and RNN is used to model temporal dynamics of the transaction data, as explained in more detail above. The computing device 102 also relies on Multi-Layer Perceptron (MLP) to compile the features into the specific featured vectors for the user 105.

Based on the feature vector for the user 105, the computing device 102 next generates, at 308, one or more recommendations for the user 105. The recommendations may be generated based on the Q-learning techniques described in detail above, or otherwise when based on the feature vectors for the specific user 105 (as compared to feature vectors for other users).

Once generated, the computing device 102 publishes the recommendation, at 310, to a party associated with the user and/or the user himself/herself. For example, the computing device 102 may publish the recommendation to a bank associated with the user 105, such as, for example, the issuer 110. Additionally, or alternatively, the computing device 102 may publish the recommendation(s) directly to the user 105, via the communication device 116.

It should be appreciated that the recommendations may relate to, for example, offers associated with the financial industry subsectors, including banks, credit card issuers, payment processors, and e-commerce platforms.

As also shown in FIG. 7, acceptance or decline of the recommendations may be provided to the computing device 102, which may be considered in compilation of the feature vectors for the user 105 (as indicated by the feedback line in FIG. 7) or in generating the recommendations. In this way, the computing device 102 is adaptable to inputs from the user 105, which is indicative of the preferences thereof.

In view of the above, the systems and methods herein provide deep learning techniques for feature extraction, reinforcement learning for preference modeling, and/or natural language processing for unstructured data analysis, which provides a novel methodology for creating personalized recommendations. The novel methodology provides, without limitation, a more thorough grasp of user preferences and behavior by integrating both structured and unstructured data. Additionally, by utilizing reinforcement learning, the systems and method herein may adjust in real-time to changes in user preferences and transaction patterns, and thereby produce recommendations that are highly pertinent and prompt.

It should be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) accessing transaction data representative of a plurality of transactions, the transaction data including unstructured data describing ones of the plurality of transactions and structured data indicative of the transactions, at least a portion of the transactions involving a user; (b) compiling, using a convolution neural network (CNN) with the unstructured data from the transaction data and a recurrent neural network (RNN) with the structured data of the transaction data, one or more feature vectors indicative of the user; (c) generating a recommendation, based on the one or more feature vectors for the user, the recommendation including at least one action; and/or (d) publishing the recommendation to a party associated with the user and/or the user.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) accessing demographic data and transaction data, the transaction data including unstructured transaction data, at least a portion of the transaction data and the demographic data involving a user; (b) extracting relevant features from the unstructured data, based on one or more natural language processing techniques; (c) extracting features from the demographic data using a convolutional neural network (CNN); (d) modeling temporal dynamics of the transaction data using a recurrent neural network (RNN); (e) combining the extracted features from the demographic data and the transaction data, using a Multi-Layer Perceptron (MLP) approach, into a profile feature vector; (f) utilizing a Reinforcement Learning approach, specifically Q-Learning, to learn user preferences based on the profile feature vector; (g) generating personalized recommendations based on preferences from the Q-Learning and/or the transaction data specific to the user; and/or (h) publishing the personalized recommendations to the user at a communication device associated with the user.

The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more example embodiments of the present disclosure are provided for purpose of illustration only and do not limit the scope of the present disclosure, as example embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being “on,” “engaged to,” “connected to,” “coupled to,” “associated with,” “included with,” or “in communication with” another feature, it may be directly on, engaged, connected, coupled, associated, included, or in communication to or with the other feature, or intervening features may be present. As used herein, the term “and/or” and the phrase “at least one of” includes any and all combinations of one or more of the associated listed items.

Although the terms first, second, third, etc. may be used herein to describe various features, these features should not be limited by these terms. These terms may be only used to distinguish one feature from another. Terms such as “first,” “second,” and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112 (f) unless an element is expressly recited using the phrase “means for,” or in the case of a method claim using the phrases “operation for” or “step for.”

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for generating one or more recommendations based on, at least in part, unstructured data, the method comprising:

accessing transaction data representative of a plurality of historical transactions, the transaction data including unstructured data describing ones of the plurality of historical transactions and structured data indicative of the historical transactions, at least a portion of the historical transactions involving a user, the unstructured data including description text for product(s) involved in the ones of the plurality of historical transactions;

compiling, by a computing device, using a convolution neural network (CNN) to process the unstructured data from the transaction data and a recurrent neural network (RNN) to process the structured data of the transaction data, and a multi-layer perceptron (MLP), one or more feature vectors indicative of the user, which includes:

convolving, by the CNN, sequences of word embeddings converted from the description text for the product(s) from the unstructured data into first features;

computing, by the RNN, second temporal features of the transaction data from the structured data, the RNN including a Long Short-Term Memory (LSTM) network; and combining, by the MLP, the first features and the second temporal features into the one or more feature vectors; and generating, by the computing device, a recommendation, based on the one or more feature vectors for the user, the recommendation including at least one action relative to one or more of the product(s); and publishing the recommendation to a party associated with the user and/or the user.

2. The computer-implemented method of claim 1, wherein the unstructured data further includes transaction descriptions, amount(s) paid, and/or location(s) of the ones of the plurality of historical transactions.

3. The computer-implemented method of claim 1, wherein generating the one or more feature vectors includes extracting, by the CNN, features from demographic data of the user.

4. The computer-implemented method of claim 1, wherein generating the one or more feature vectors includes extracting, by the RNN, temporal patterns associated with at least the ones of the plurality of historical transactions.

5. A non-transitory computer-readable storage medium comprising executable instructions, which when executed by at least one processor, cause the at least one processor to:

access transaction data representative of a plurality of historical transactions, the transaction data including unstructured data describing ones of the plurality of historical transactions and structured data indicative of the historical transactions, at least a portion of the historical transactions involving a user, the unstructured data including description text for product(s) involved in the ones of the plurality of historical transactions;

compile, using a convolution neural network (CNN) to process the unstructured data from the transaction data and a recurrent neural network (RNN) to process the structured data of the transaction data, and a multi-layer perceptron (MLP), one or more feature vectors indicative of the user, by convolving, by the CNN, sequences of word embeddings converted from the description text for the product(s) from the structured data into first features;

computing, by the RNN, second temporal features of the transaction data from the structured data, wherein the RNN includes a Long Short-Term Memory (LSTM) network;

combining, by the MLP, the first features and the second temporal features into the one or more feature vectors; and generate a recommendation, based on the one or more feature vectors for the user, the recommendation including at least one action relative to one or more of the product(s); and publish the recommendation to a party associated with the user and/or the user.

6. The non-transitory computer-readable storage medium of claim 5, wherein the unstructured data includes further transaction descriptions, amount(s) paid, and/or location(s) of the ones of the plurality of historical transactions.

7. The non-transitory computer-readable storage medium of claim 6, wherein the executable instructions, when executed by the at least one processor to generate the one or more feature vectors, cause the at least one processor to extract, by the CNN, features from demographic data of the user.

8. The non-transitory computer-readable storage medium of claim 7, wherein the executable instructions, when executed by the at least one processor to generate the one or more feature vectors, cause the at least one processor to extract, by the RNN, temporal patterns associated with at least the ones of the plurality of historical transactions.

9. A computer-implemented method for generating one or more recommendations, the method comprising:

accessing, by a computing device, demographic data and transaction data, the transaction data including unstructured transaction data representative of a plurality of historical transactions, at least a portion of the transaction data and the demographic data involving a user;

extracting, by the computing device, word embeddings from the unstructured data, based on one or more natural language processing techniques;

padding, by the computing device, the extracted word embeddings to include a fixed length;

processing, by the computing device, using a convolutional neural network (CNN), the padded word embeddings into a sequence of feature vectors to extract first features from the demographic data;

modeling second temporal features of the transaction data using a recurrent neural network (RNN);

combining the first features from the demographic data and the second temporal features from the transaction data, using a Multi-Layer Perceptron (MLP) approach, into a profile feature vector;

utilizing a Reinforcement Learning approach, which includes Q-Learning, to learn user preferences based on the profile feature vector;

generating personalized recommendations based on preferences from the Q-Learning and/or the transaction data specific to the user; and publishing the personalized recommendations to the user at a communication device associated with the user.

10. The computer-implemented method of claim 9, wherein the Reinforcement Learning approach is adapted in real-time to respond to changes in preferences of the user and/or one or more transaction patterns.

11. The computer-implemented method of claim 10, wherein the unstructured transaction data includes descriptions of product(s) involved in the plurality of transactions, amount(s) paid, and/or location(s); and wherein the personalized recommendations is specific to one or more of the product(s).

12. The computer-implemented method of claim 11, wherein the recommendations include one or more personalized offers, discounts, and/or promotions.

* * * * *